Feb. 17. 1925.

B. E. CHURCH 1,526,628

GLAND PACKING

Filed June 14. 1923

INVENTOR.
Bonneval Edward Church

Patented Feb. 17, 1925.

1,526,628

UNITED STATES PATENT OFFICE.

BONNEVAL EDWARD CHURCH, OF SOUTHWARK, ENGLAND, ASSIGNOR OF ONE-HALF TO JOHN DEWRANCE, OF SOUTHWARK, SURREY, ENGLAND.

GLAND PACKING.

Application filed June 14, 1923. Serial No. 645,427.

*To all whom it may concern:*

Be it known that I, BONNEVAL EDWARD CHURCH, a subject of the King of Great Britain and Ireland, residing at 155 Great Dover Street, Southwark, in the county of Surrey, England, have invented new and useful Improvements in Gland Packings, of which the following is a specification.

This invention relates to gland-packings of the type described in the specification to British Letters Patent, dated the 16th September, 1902, No. 20208; such packings being more particularly intended for use with valves and other appliances employed with superheated steam, and according to which two rings, composed of asbestos fibre and india rubber vulcanized were placed face to face and had annular grooves in their adjacent faces, the cavity so formed being charged with material of a soft and yielding nature. According to the improved method of construction the subject of the present application, the side-walls of the cavity, filled with the yielding material, are lined with tubes composed of thin copper or other suitable and fairly ductile metal.

Figure 1:
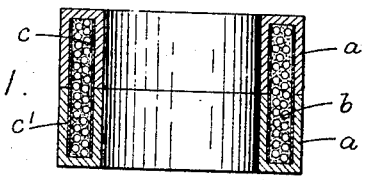
Figure 2:
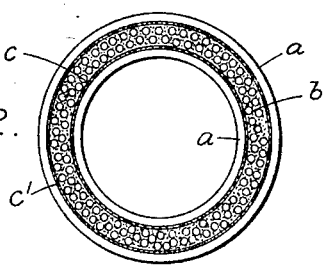
Figure 3:
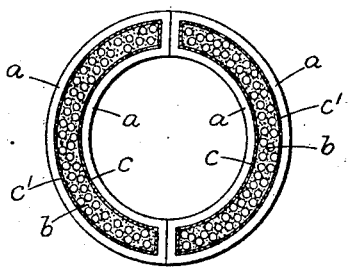

In the accompanying drawings, Fig. 1 is a longitudinal section and Fig. 2 a transverse section taken at the mid height of Fig. 1 of a stuffing-box packing arranged according to my improved method. Fig. 3 is a transverse section illustrating a modification wherein a like packing is constructed in halves for convenience of application.

The packing illustrated in Figs. 1 and 2 comprises a casing consisting of two ring-shaped parts $a$ $a$, composed of asbestos fibre and india rubber, vulcanized to a hard condition, and having channels in their adjacent faces; the cavity $b$ so formed being filled with metal balls composed of suitable metal resembling dust shot—by preference nickel—in conjunction with graphite; but the side-walls of the cavity are lined with two tubes $c$, $c^1$, composed of thin and fairly ductile metal, such as copper and extending the full length of the cavity $b$. These tubes may be of the solid drawn or of the brazed type, but I prefer to form them from sheet metal with their longitudinal edges abutting or slightly overlapping, these edges being lightly soldered to enable the packing temporarily to retain its desired form. The joint is however feeble and unable to resist lateral expansion of the packing upon axial pressure being applied thereto.

For convenience in application, each of the said grooved rings, as also each of the liners, may, as illustrated in Fig. 3, be divided longitudinally into two parts, each constituting a semi-circular ring capable of being applied to a piston-rod, valve-stem or the like, from opposite sides. In this modification, however, it is desirable, although not essential, to make good the cut surfaces with end-walls in order to retain the yielding material in position during handling prior to installation, unless the granular material is made up with hard grease or the like.

Upon tightening the gland the packing is subjected to pressure in a longitudinal direction with the effect that the yielding contents of the chamber $b$ are compressed and caused to exert a lateral pressure upon the side-walls of the rings $a$; thereby forcing them into intimate contact with the surface of the piston rod or valve-stem on the one side and that of the stuffing-box on the other side, thus rendering the device fluid-tight.

I claim:—

1. A gland-packing consisting of two rings, composed of asbestos or other fibrous heat-resisting material and having channels in their adjacent faces, the walls of the cavity so formed being lined with thin and fairly ductile metal tubes and filled with balls composed of suitable metal, resembling dust-shot, in conjunction with graphite.

2. A gland-packing as defined in claim 1 and wherein the channelled rings and their metallic liners are divided longitudinally into two parts, each constituting a semi-circular chamber, adapted to retain the yielding material prior to placing the packing in operative position.

BONNEVAL EDWARD CHURCH.